May 16, 1950 D. W. HOSLER 2,508,261
ANTIFRICTION SCREW DEVICE
Filed July 7, 1948 2 Sheets-Sheet 1

INVENTOR.
Donald W. Hosler
BY Robb + Robb
Attorneys

May 16, 1950 — D. W. HOSLER — 2,508,261
ANTIFRICTION SCREW DEVICE
Filed July 7, 1948 — 2 Sheets-Sheet 2

INVENTOR.
Donald W. Hosler

Patented May 16, 1950

2,508,261

UNITED STATES PATENT OFFICE 2,508,261

ANTIFRICTION SCREW DEVICE

Donald W. Hosler, Bay Village, Ohio

Application July 7, 1948, Serial No. 37,359

12 Claims. (Cl. 74—459)

My present invention pertains to the art of anti-friction screw units commonly known as ball bearing screw devices, and sometimes called frictionless screw and nut combination units.

The primary object of my invention has been to provide certain novel improvements in frictionless screw units of the class referred to, with a view to increasing the efficiency of such devices by reduction of friction between the balls forming the thread between the screw and nut elements of the unit.

In the ordinary type of these units, as indicated above, a column of hard metal balls forms a rolling thread within the nut. The balls are interposed between the screw and the nut in semi-circular grooves provided in said parts, and when relative axial rotation is imparted to the component parts, the balls are caused to roll toward one end of the nut during such rotation, moving in the spiral paths provided by the matching helical grooves of the screw and nut. When the balls reach a point approximately at the end of the nut during said relative rotation of the screw and nut parts, they are caused to pass from the ball grooves into a by-pass or return tube or passage, to the opposite end of the nut and back into the ball groove between the nut and screw, again.

While, generally speaking, it would appear that little or no friction would be created between the screw and nut in the use of the balls interposed between these elements, nevertheless, under some conditions, where a long nut is required due to the loading adaptations of the device, the friction generated between the balls by their direct contact, may at times be so great as to militate against the utility of the frictionless screw unit.

The above problem has been recognized in the art of screw and nut devices utilizing the interposed balls virtually constituting the loading thread interlocking the screw and nut parts together, and means have heretofore been proposed for overcoming the disadvantages that may arise incident to the cumulative rolling friction contact between the train of balls.

Two types of frictionless screw units have been proposed and are known, which have been designed with a view especially to the reduction of the cumulative friction which is generated between the balls of the train of balls working between the screw and the nut, during the loading of one of these elements and their relative rotation, incident to the rolling contact of the balls with each other under loading conditions. One type referred to involves the use of uniform size balls for the ball train, and has recourse to the employment of a plurality of by-pass or return passages for carrying the balls from one end of the nut to the other so that during movement of the balls through such return passages, sometimes tubes, the loading of the balls is relieved, thereby to break up the accumulation of resisting friction contact between all of the balls by dividing the loading of the train of balls into a series of loaded ball sections intermediate the screw and the nut. For instance, if say seven and one-half turns of ball thread for the carrying of the load is necessary, at least three ball return tubes or passages would be necessary in carrying out the friction reducing objective of the type of unit just referred to.

Now in respect to the other type of unit designed with an objective similar to that of my present invention, recourse is had to the employment of alternate balls for carrying the load with intermediate smaller diameter non-load bearing balls. Where this expedient is resorted to, as compared with the instance of seven and one-half turns of ball thread mentioned in discussing the previous type of construction, since only alternate balls carry the load, an active thread for the balls would have to be increased to an extent approximately double the seven and one-half turns employed when the units having three ball return passages are utilized. Of course, with the employment of the alternate balls for carrying the load, a single return passage for the balls from one end of the nut to the other may be availed of, and there will be no rubbing friction between the load carrying balls in the second type construction just discussed.

A special object of my invention is to provide improved means for accomplishing the desired result above outlined, without recourse to using a multiplicity of ball return passages on the nut and without having to employ two different sizes of balls requiring the approximately one hundred per cent increase in the size or length of the nut, not to mention the disadvantage of the expenditure of time incident to sorting the balls into the unit assembly so that larger balls will be spaced by alternate smaller balls, all of which will be obvious.

In the carrying out of my invention I have had in mind to employ a construction for accomplishing the result of relief of cumulative friction of a train of balls forming a ball thread of the class in mind without materially increasing the cost of the construction of the two main elements of the unit, notably the screw and the nut, while still enabling the employment of balls of uniform size so that no special sorting of the latter is required in assembling the parts of my unit. With the foregoing in view, therefore, I have so designed the screw section or portion of one of the frictionless screw device parts, either the screw itself or the nut, as to provide what I call friction relief zones or pockets at one or more intervals in the length of the screw portion of the screw or nut. By utilizing the above friction relief zones at suitable intervals, a ball or balls of the complete train of balls in the unit will automatically enter such zone or zones during the relative axial rotation of the screw and nut parts, thus to be relieved of the friction loading of the said balls momentarily during such rotation, whereby to virtually break up the train of balls into ball train sections between which there is eliminated the rolling friction incident to movement of the balls under loaded condition. In this manner I correspondingly break up the continuously accumulated rolling friction between all of the balls of the train of balls such as is found in the ordinary type of frictionless screw or gear units to which my invention relates and by which, in the use thereof, the problem of my invention has not been met and overcome.

Describing my invention in another way, it being understood that the screw and nut have corresponding matching ball grooves, the latter provide a ball path in and along which the balls roll, largely in rubbing contact, when the screw and nut are relatively rotated. The friction relief zones described above are provided in a wall portion of such ball path.

A more full understanding of the manner in which I have accomplished the results above outlined in the carrying out of my invention will be had upon reference to the following detail description, and to the accompanying drawings.

In the drawings:

Figure 1 shows a generally conventional type of frictionless screw and nut unit in conjunction with which my invention is employed, the view showing certain new means for holding in place a removable by-pass or ball return tube such as commonly used in certain of these devices today.

Figure 2 is a sectional view through the nut of the unit of Figure 1, taken about on the line 2—2 of said Figure 1, looking in the direction of the arrows and showing the grooved portion of the nut in perspective, also showing the provision in such grooved portion of the relief zones or pockets provided according to my invention. The size of said relief zones is somewhat exaggerated because in actual devices of the construction of my invention these zones are virtually microscopic in nature and difficult to be detected by the use of the naked eye.

Figure 3 is a perspective view of the retainer plate employed as in Figure 1 for holding the by-pass or return tube in position on the nut.

Figure 4 is a developed or opened up view of the grooved or threaded portion of the inside of the nut as if the nut is cut through longitudinally and laid out flat, showing more clearly the relief zones or pockets at different locations in the length of said groove, said pockets being formed, however, according to a modified arrangement, only at one side of the groove, as distinguished from the form of the relief zone or pocket illustrated in Figure 2 which is of a type extending into opposite sides of the grooved portion of the nut.

Figure 8:
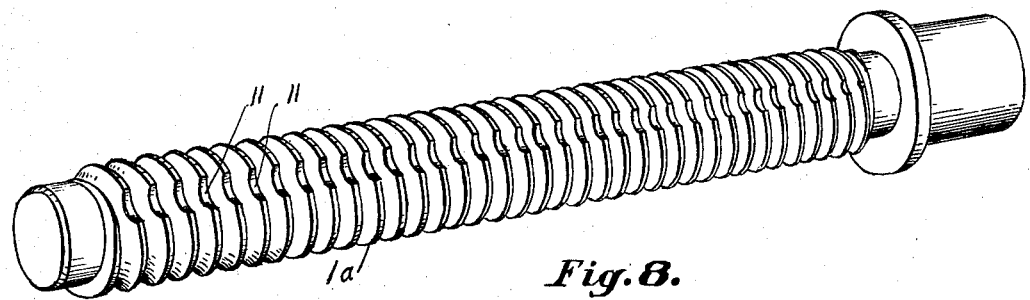
Figure 8 illustrates a conventional form of ball grooved screw such as used in units of the class of my invention, the same provided with a longitudinal groove across the thread by which to afford relief zones for balls operating between the walls of said thread.
Figure 10:
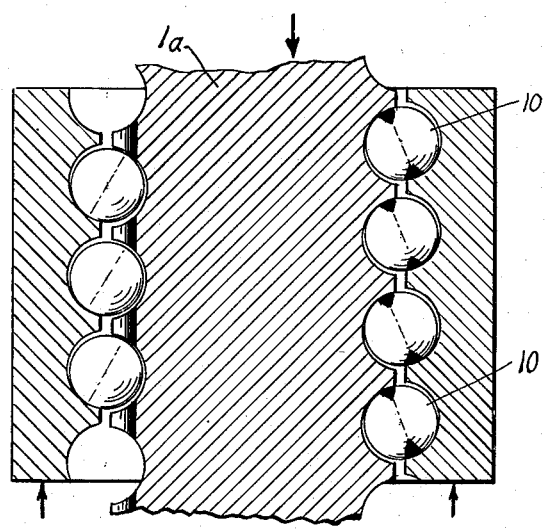

Figure 10 is a sectional view showing the combined nut and screw, the screw broken away, and having one or more longitudinally disposed friction relief zones in its grooved portion, the balls being shown in place and certain of the balls having black triangular indicia to note the points of loaded contact between the nut and the screw and said balls, the screw being that of my invention shown in Figure 8.

Figure 11:
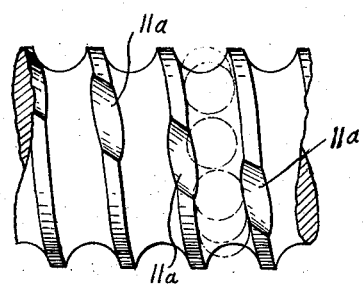
Figure 9:
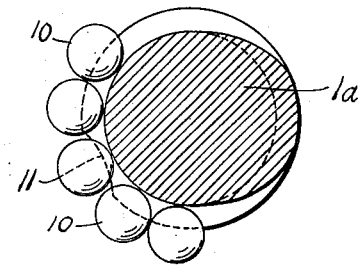
Figure 9 is a typical cross section of a screw such as shown in Figure 8, with several of the bearing balls in their relative positions, one located as when opposite the friction relief zone or pocket in the adjacent wall of the ball groove or thread.

Figure 11 is a fragmentary view of a modified form of screw having the relief zones in the same or somewhat different form from those illustrated in Figure 8, in that said zones are provided by recesses in the perimeters of the threaded portions of the screw, which recesses are generally disposed helically of the axis of the screw as the modified adaptation.

Bearing in mind my special objective of reducing the friction between the balls of the chain of balls ordinarily operating in frictional contact with each other between the screw and nut elements of my unit, by breaking up, so to speak, the continuity of the long loaded helical column or train of such balls into relatively short loaded columns or train sections, I now proceed to describe the several adaptations of my invention according to the constructions disclosed in the drawings.

Figure 1:
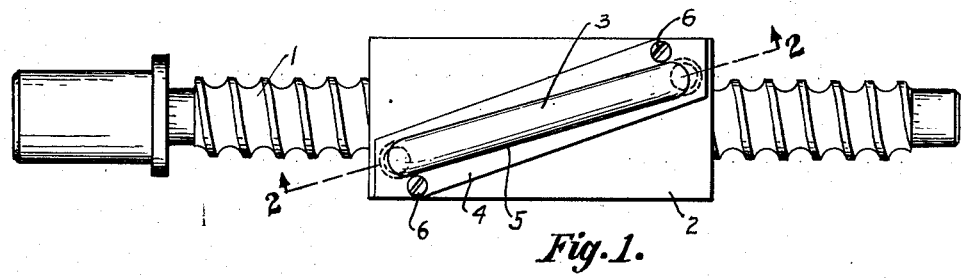
Figure 3:
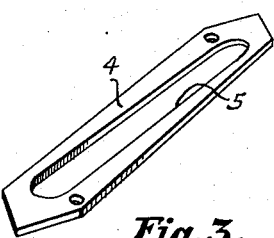

In Figure 1 the ball screw is designated 1 and the nut having the helical grooved longitudinal opening therein for receiving loosely the screw 1 is denoted at 2. The ball by-pass or return tube is designated 3, and, generally speaking, is of a common type presently used, the opposite ends of which extend laterally to the body of the tube and enter transverse openings in the nut 2 so as to bring these ends into position for receiving or delivering the balls passing through the tube 3 to the matching helical grooved portions of the nut and the screw.

I provide means for preventing accidental displacement of the tube 3 from the nut 2 in the form of a plate 4 having a longitudinal and somewhat diagonally disposed slot 5 therein of a dimension conforming largely with that of the tube 3 itself for receiving said tube when the plate 4 is secured by screws 6 to a side of the nut 2. The end portions of the plate 4 at the opposite extremities of the slot 5 slightly overlie the curved end portions of the tube 3 as at the points designated 7 in Figure 2, whereby to engage the tube ends in such a manner as to hold the tube 3 in place on the nut 2 until the plate 4 is removed or detached.

The nut 2 shown in Figure 2 may be of the construction illustrated in Figure 2 of my drawings, or of certain other constructions embodied in modified adaptations of my invention elsewhere illustrated in the drawings and to be later described. According to the structure of the nut in Figure 2, it will be observed that the ball groove 8 of the nut is formed at intervals in its length with what I call relief zones or pockets 9. In this construction the zones 9 are located in the opposite walls of the groove 8 at such intervals as mentioned, and they are, practically speaking, in commercial devices of the form of my invention, of exceedingly slight depth but such as to afford enlarged spaces in which the balls are momentarily freed from loading while in contact with adjacent balls, as the balls move in their circuit. Usually under loaded conditions, adjacent balls of the ball train rotate in one direction as the complemental screw and nut are rotated, producing high resisting friction at the contacting portions of the balls, which portions turn in opposite directions. In my construction, when a ball arrives at the specially provided recessed relief zone 9, it is relieved of the movement compelled by the loading frictional contact with the screw and nut parts, and is freed so it may turn in a direction opposite to its normal direction of rotation, incident to rolling contact of adjacent balls, to act in the manner of an idler between two immediately adjacent balls, thus eliminating the said resisting friction at the point where it is so freed. In this way my invention is intended to break up the accumulated friction between the long helical column or train of balls into short columns or train sections by causing the balls to pass the said friction relief zones or pockets 9 to automatically relieve them of the load at such time. At the points in the groove 8 where the relief zones 9 are formed, the arc of curvature of the groove will, of course, be slightly larger than that of the periphery of the balls, or, in other words, the radius of the ball path where each of the zones 9 is located will be greater than the radius of the balls which operate in the said groove and that of the screw which matches the same and is formed on the same helical pitch thus providing such path.

Figure 4:
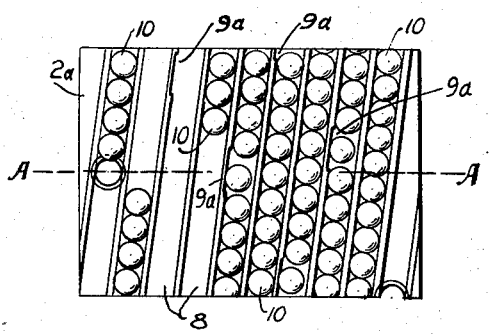

Having in mind now the principle of my invention involving the dividing up of the long column or train of loaded bearing balls operating in the ball bearing path or passage formed by the matching helical grooving of the screw and nut elements, into shorter columns or sections between which intervenes the momentarily freed ball, which is unloaded, I refer next to the construction illustrated in Figure 4 of my drawing. In this figure, which is a view showing the nut cut through at one side on a longitudinal line, as for instance the line A—A indicated, and laid open or flat, the balls are shown in their travel path above referred to, and the friction relief zone or zones or pockets are located in only one wall of the ball groove of the nut designated 2a in this figure. It will be observed that the friction relief zones marked 9a are at equi-distant points in the helix of the ball groove and separate the ball train or column into short loaded sections comprising approximately fourteen balls each.

Figure 6:
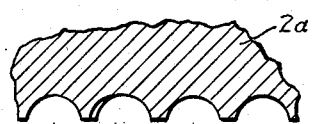
Figure 6 is a fragmentary sectional view showing several of the groove portions of either a nut or screw and illustrating the friction relief zone or pockets at one side of the grooved portion only.

The form of the relief zones 9a as shown in Figure 4 is shown in addition by the cross-sectional view of Figure 6 taken transversely through a few of the grooved sections of the nut crosswise of the relief zone or pocket referred to.

Figure 2:
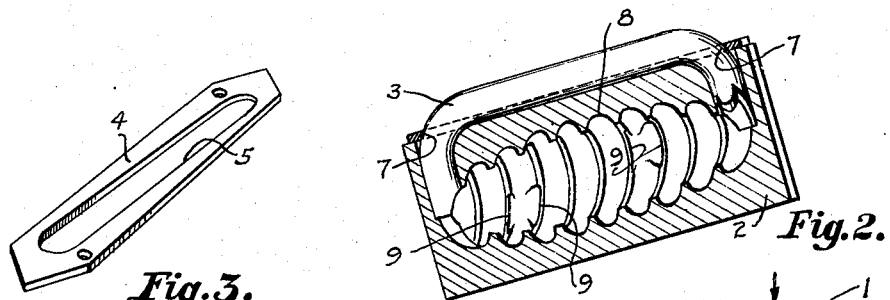
Figure 7:
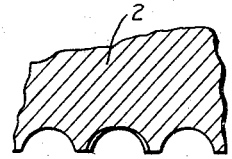
Figure 7 is a view similar to Figure 6 but illustrating the relief zones as they are formed in opposite walls of the grooved portions of the nut or screw, in either of which they may be provided.

In Figure 7 of my drawings I illustrate by a fragmentary view similar to Figure 6, the form of the double relief zones as depicted in Figure 2, wherein said zones are slight recessions or pockets in opposite walls of the bearing ball grooves as described in the construction of Figure 2.

Figure 5:
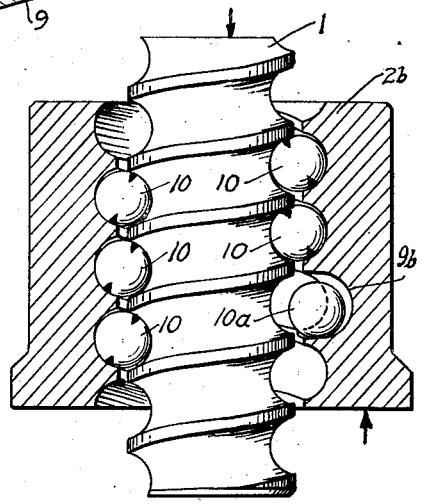
Figure 5 is a sectional view through a modified form of screw and nut device, the black triangular spots on the balls indicating the pressure points in the normal loaded operation thereof, and one of the balls being revealed as freed from loaded friction and contact with adjacent balls by having been received in a relief zone or pocket formed in the direction of the depth of the groove of the nut.

Now it is additionally feasible, in carrying out my invention, to resort to the construction of the relief zones as depicted by Figure 5 of my drawings, which illustrates one of said zones at 9b as formed in the deepest portion of the ball groove, or otherwise described as produced by a depression in the direction of the depth of said groove. Figure 5 shows how the balls are operating in the ball path provided by the combined grooves of the screw 1 and the nut 2b. In this view the black arrowheads or triangular indications show the points of loaded contact of the majority of the balls, but the ball designated 10a of the group of balls 10 is illustrated as having entered the friction relief zone 9b so as to be free of loading, thereby separating the column of balls into the shorter columns or ball train sections at opposite sides of the said relief zone 9b.

This brings me to the illustration of the modified form of my screw which is designated 1a in Figures 8 and 10. It will be seen from these figures that the relief zones 11 in this construction of screw are formed by cutting away or indenting the thread portions of the screw produced by the ball grooving at the perimeters of said thread portion. While all of said thread portions are formed with said relief zones 11, it is obvious that such are not needed as to exact number because if one or several of these zones are provided for the screw or a section of the screw length which operates in the ball groove of the nut, then, under the loaded conditions of the unit, the column or train of balls operating in the nut will be divided up into the separate columns or short trains at the points between the locations of the relief zones 11, of which preferably several would be employed in the length of the screw that is housed by or operates in the nut itself. In the screw shown, the columns of loaded balls are relieved at every turn of the rolling thread.

Figure 11 illustrates how the relief zones or pockets 11a of the type designated 11 in Figure 8 may be disposed on a spiral or helix relatively to the axis of the screw 1a, and this expedient may also be resorted to within the province of my invention. The cutting away of the outer perimeters of the screw threads of the screw 1a, virtually speaking, provides load relief recesses having somewhat the characteristics of those which are shown in Figures 2, 4, 6, and 7 in that virtually speaking, there is a removal of metal in the ball groove of the screw at opposite sides of the groove and in the opposite walls of the same which is the principle of the formation of the friction relief zone as referred to in the earlier figures of my drawings just above named.

In the constructions shown in the drawings the friction relief zones become active in relation to the moving balls when loading stress is applied to the members of the unit in either direction, irrespective of whether the said zones are formed in either one or both sides of the ball path.

From the foregoing it will be observed that by the various constructions and adaptations of my invention hereinbefore treated, I have achieved the objectives desired and outlined at the commencement of this description, by the employment of a most simplified type of structure in producing the various kinds of friction relief zones that constitute the primary feature of my invention, the expedients resorted to in producing the said zones involving relatively small expense and practically no change in the fundamental structure of the screw and nut elements of the frictionless bearing.

The depth of the cut which forms the relief zones must be such that its throat falls inside the pressure line of the balls. In other words, the radial depth from longitudinal center line of screw must be somewhat less than the distance from center line of the screw to the load bearing points of contact of the ball in the ball groove. In Figure 10 the light broken lines across the balls may be understood to be the pressure line of the balls.

The reason the groove 11 has a curved throat is that in most screws of a reasonably large diameter a flat on the screw, instead of a curved groove, would give too long a relief zone on the top of the thread, and the resulting width of the relief zone on the screw would be greater than necessary. The width of the relief zone need in practice only equal the diameter of the ball.

Having thus described my invention, what I claim as new and desire to secure by Letters Patent of the United States, is:

1. An anti-friction ball and screw unit comprising, in combination, a screw, a nut thereon, said screw and nut formed with matching helical ball grooves the walls of which provide a continuous ball path therebetween, the nut having by-pass means leading into portions of the said ball path at spaced points axially of the nut for passing of balls from and to said path, a train of contacting balls disposed in a relatively long helical column for movement in and along said ball path incident to relative axial rotation of the nut and screw, and said recessed ball path being provided with a ball friction relief zone at one point at least in a wall thereof for receiving balls as they move through said path to reduce accumulated pressure between balls of the ball train located at opposite sides of such zone.

2. A unit as claimed in claim 1, in which the relief zone extends axially of the ball path and comprises a space increasing the diameter of the ball path.

3. A unit as claimed in claim 1, in which the relief zone is a space which extends radially of the axis of the screw.

4. A unit as claimed in claim 1, in which the relief zone enlarges the size of the ball path sufficiently to remove loading stress on a ball received in such zone.

5. An anti-friction ball and screw unit comprising, in combination, a screw, a nut thereon, said screw and nut formed with matching helical ball grooves the walls of which provide a continuous ball path therebetween, the nut having by-pass means leading into portions of the said ball path at spaced points axially of the nut for passing of balls from and to said path, a train of balls disposed for movement in and along said ball path incident to relative axial rotation of the nut and screw, and said ball path being provided with recessed ball friction relief zones comprising spaces extending axially of the unit in opposite wall portions thereof for receiving the balls moving through such path and relieving normal loading pressure on a ball received in such zones.

6. A unit as claimed in claim 1, in which the relief zone is formed in a wall of the groove of the nut.

7. A unit as claimed in claim 1, in which the relief zone is formed in a wall of the groove of the screw.

8. A unit as claimed in claim 1, in which the relief zone is of a dimension such that a ball received therein is at such time not in rolling contact with both the screw and nut, thus relieving frictional resistance between sections of the ball train at opposite sides of said zone.

9. An anti-friction ball and screw unit comprising, in combination, a screw, a nut thereon, said screw and nut formed with matching helical ball grooves the walls of which provide a continuous ball path therebetween, the nut having by-pass means leading into portions of the said ball path at spaced points axially of the nut for passing of balls from and to said path, a train of balls disposed for movement in and along said ball path incident to relative axial rotation of the nut and screw, and said ball path being provided with a plurality of recessed friction relief zones within the confines of the nut, each such zone dimensioned axially of the unit so that balls received therein are relieved of loading stress applied to the unit, thereby eliminating frictional resistance between a section or sections of the ball train at opposite sides of said zones.

10. An anti-friction ball and screw unit comprising, in combination, a screw, a nut thereon, said screw and nut formed with matching helical ball grooves the walls of which provide a continuous ball path therebetween, the nut having by-pass means leading into portions of the said ball path at spaced points axially of the nut for passing of balls from and to said path, a train of balls disposed in a plurality of helical turns of said ball path for movement in and along said ball path incident to relative axial rotation of the nut and screw, the wall of the nut groove being recessed at least at one point within the confines of the nut for providing a friction relief zone eliminating loading friction on a ball or balls when entered into such zone and accumulated pressure between balls of the train on opposite sides of the said zone.

11. An anti-friction ball and screw unit comprising, in combination, a screw, a nut thereon, said screw and nut formed with matching helical ball grooves the walls of which provide a continuous ball path therebetween, the nut having by-pass means leading into portions of the said ball path at spaced points axially of the nut for passing of balls from and to said path, a train of balls disposed for movement in and along said ball path incident to relative axial rotation of the nut and screw, the wall of the screw groove being recessed at least at one point at portions operating within the confines of the nut for providing a friction relief zone or zones eliminating loading friction on a ball or balls when entered into such zone or zones.

12. An anti-friction ball and screw unit comprising, in combination, a screw, a nut thereon, said screw and nut formed with matching helical ball grooves the walls of which provide a continuous ball path therebetween, a by-pass tube detachably mounted on the outer side of the unit and having laterally bent ends thereof extending to and communicating with the said ball path at spaced points axially of the nut, and a plate formed with a slot longitudinally thereof receiving therein the body of the tube and detachably secured to the nut so that the end portions thereof overlie and engage the outer sides of the curved ends of the by-pass tube to prevent unauthorized displacement of the said tube.

DONALD W. HOSLER.

REFERENCES CITED

The following references are of record in the file of this patent:

UNITED STATES PATENTS

| Number | Name | Date |
| --- | --- | --- |
| 2,322,000 | Douglas | June 15, 1943 |
| 2,380,662 | Means, Jr. | July 31, 1945 |
| 2,441,168 | Richardson | May 11, 1948 |